July 6, 1965  R. BERGESON  3,192,693
TRIMMER ATTACHMENT FOR POWER LAWN MOWER
Filed July 2, 1963  3 Sheets-Sheet 1

Ragnvald Bergeson
INVENTOR.

BY *(signatures)*
Attorneys

July 6, 1965     R. BERGESON     3,192,693
TRIMMER ATTACHMENT FOR POWER LAWN MOWER
Filed July 2, 1963     3 Sheets-Sheet 2

Ragnvald Bergeson
INVENTOR.

July 6, 1965  R. BERGESON  3,192,693
TRIMMER ATTACHMENT FOR POWER LAWN MOWER
Filed July 2, 1963  3 Sheets-Sheet 3

Ragnvald Bergeson
INVENTOR.

BY Clarence A. O'Brien
and Harvey B. Jackson
Attorneys

United States Patent Office 3,192,693
Patented July 6, 1965

3,192,693
TRIMMER ATTACHMENT FOR POWER LAWN MOWER
Ragnvald Bergeson, 381 Colonial Court, Dunedin, Fla.
Filed July 2, 1963, Ser. No. 292,300
10 Claims. (Cl. 56—25.4)

This invention comprises a novel and useful trimmer attachment for a power lawn mower and more particularly pertains to a lawn edger and trimmer attachment adjustably and removably mounted upon a conventional power operated lawn mower of the rotary type.

In the proper care of lawns it is frequently necessary to not only employ a power operated lawn mower for the purpose of mowing or cutting the grass but it is then necessary to follow up this operation with the use of a machine for edging or trimming the border of the lawn and around walks, shrubbery and the like. This usually requires the use of two separate machines and two separate operations. Considerable time obviously could be saved and the lawn could be simultaneously mowed and trimmed if the lawn mower could be converted into a device for not only mowing the lawn but also for edging and trimming the same.

It is therefore the primary purpose of this invention to provide an edging and trimming attachment which may be readily applied to conventional power operated lawn mowers and operated by the power plant thereof and which may be selectively brought into operation as desired so that when the edge of the lawn is being mowed it can also be trimmed by the attachment.

A further object of the invention is to provide an edging and trimming attachment for power lawn mowers which may be mounted in a simple manner upon the conventional lawn mower frame and may be readily connected to the power plant of the lawn mower for simultaneous operation thereby.

A still further object of the invention is to provide an attachment in accordance with the foregoing objects in which the vertical height of the attachment from the ground may be readily adjusted to effect penetration of the soil to varying depths in the edging and trimming operation and to selectively raise the attachment above the soil and out of operative contact with the lawn when its services are no longer required.

Yet another object of the invention is to provide a device in accordance with the preceding objects wherein the edging and trimming attachment shall be provided with an improved protective shield or guard structure preventing accidental contact of the edger blade of the attachment with persons and also preventing damage of the blade of the attachment by its accidental encountering of objects and surfaces which might damage the same.

A further and more specific object of the invention is to provide an attachment in accordance with the foregoing objects which shall be capable of ready reversal in its position upon the lawn mower so that the edging and trimming operation may selectively be provided at either side of the lawn mower without in any way impairing the effectiveness of the edging or trimming operation and its connection with the power plant of the lawn mower.

Still another object of the invention is to provide an edger blade attachment for power lawn mowers which shall by means of angulated extremities on the edger blade effect a beveled cutting and trimming of the edge of the lawn thereby imparting a more pleasing appearance and producing a trimmed edge of a greater width which will require less frequent re-trimming.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
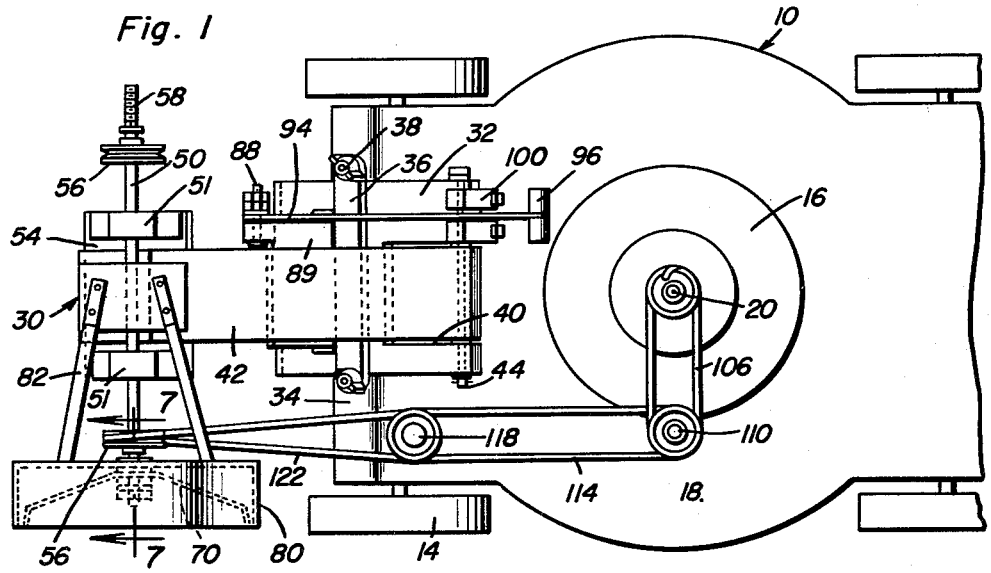
FIGURE 1 is a top plan view of a conventional type of a power operated lawn mower, parts being broken away of the rotary blade type and showing the mounting of a preferred embodiment of an edging and trimming attachment in accordance with this invention thereon.
Figure 2:
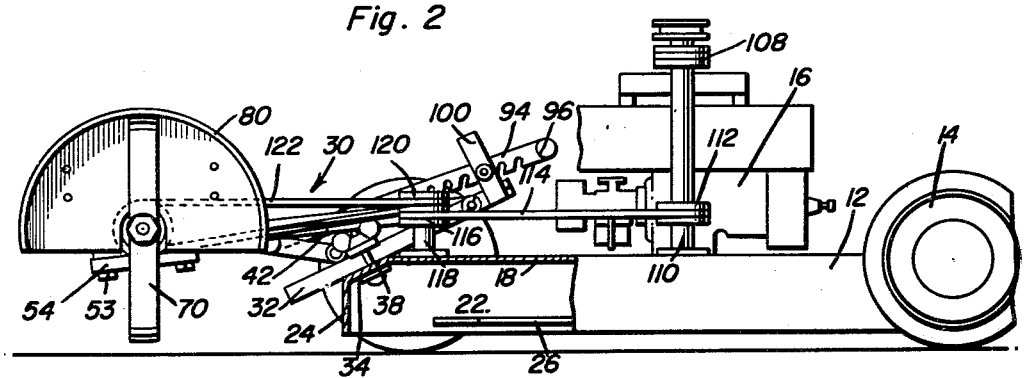
FIGURE 2 is a side elevational view of the construction of FIGURE 1, part of the lawn mower support frame being broken away and shown in vertical section therein.
Figure 3:
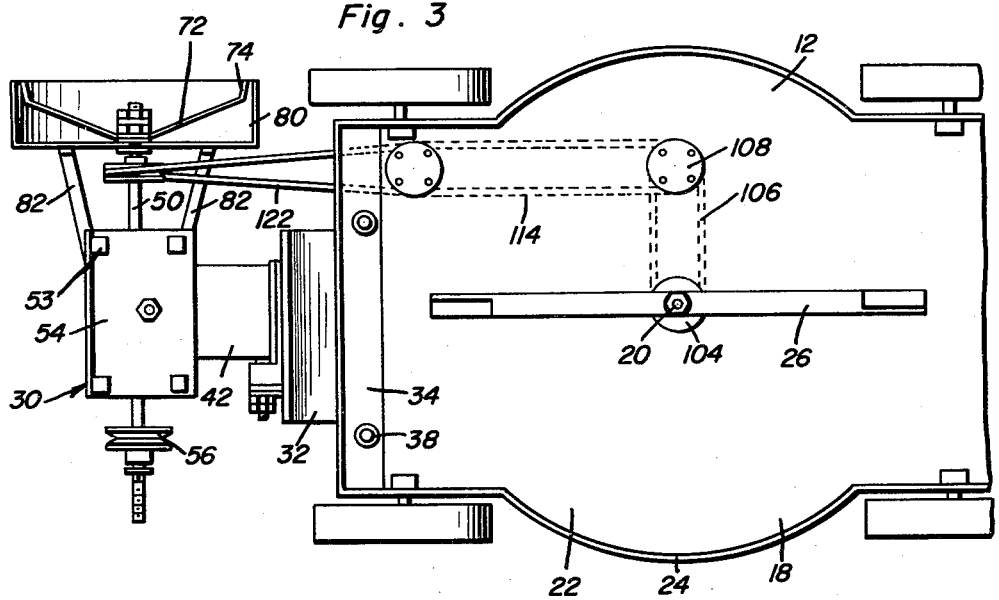
FIGURE 3 is a bottom plan view of the arrangement of FIGURES 1 and 2, the driving means for the attachment being shown in dotted lines therein.
Figure 4:
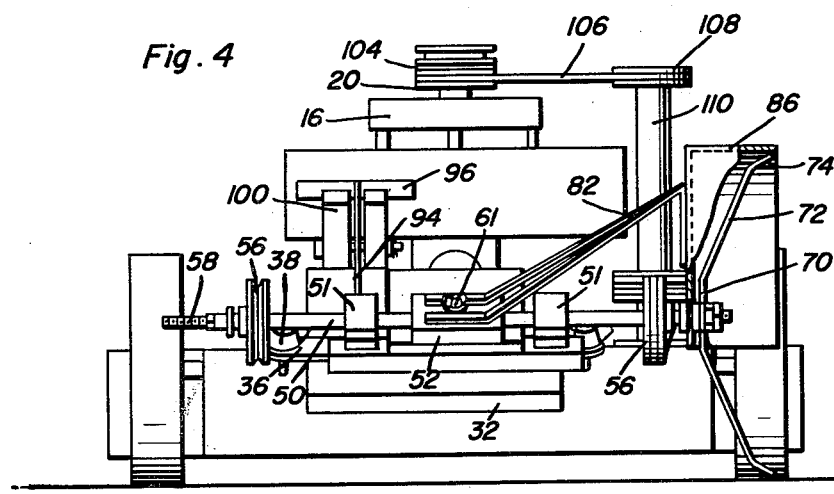
FIGURE 4 is a front elevational view of the lawn mower showing the attachment applied thereto.
Figure 6:
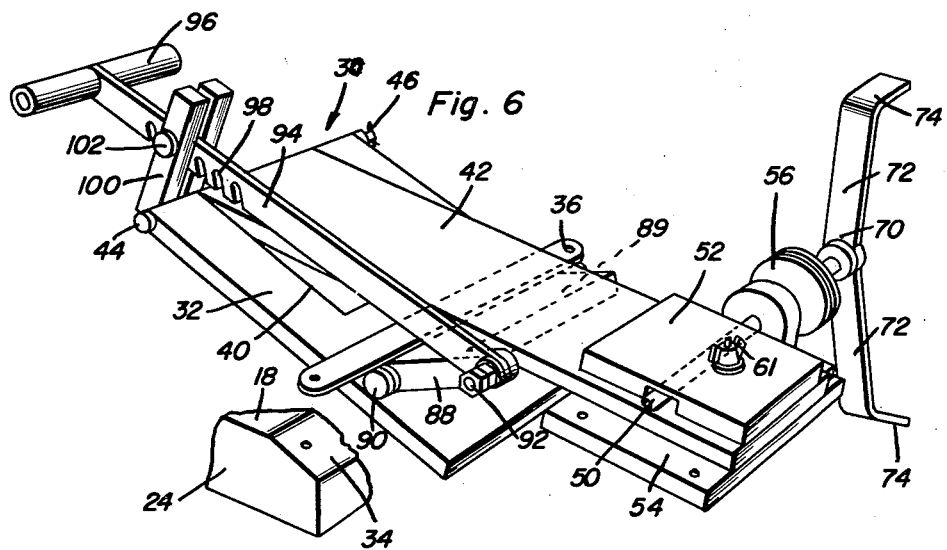
Figure 7:
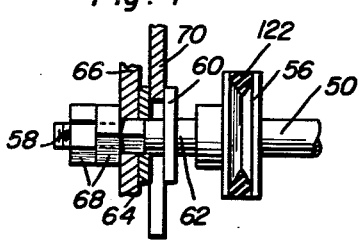

FIGURE 6 is a perspective enlarged view of the attachment removed from the lawn mower, parts being broken away and with the edger guard removed from the attachment; and, FIGURE 7 is a detailed view in vertical transverse section taken upon an enlarged scale substantially upon the plane indicated by section line 7—7 of FIGURE 1 and showing the manner in which the edger attachment is removably secured to the edger shaft of the device.

In the accompanying drawings, the numeral 10 designates generally any conventional type of power operated lawn mower and especially one of the rotary blade type such as the well known Toro power operated lawn mower. This lawn mower includes the usual mobile housing or support frame 12 mounted upon wheels 14 which may or may not include a power operated driving wheel and with a power plant such as an internal combustion engine 16 mounted upon the top surface or top wall 18 of the support frame. Journaled in this top wall is a vertically extending shaft 20 which extends into the mowing chamber 22 disposed below the top wall 18 and within the enclosing and confining skirt or side wall 24 of the support frame. This shaft carries at its lower end a horizontally extending mowing blade 26 of conventional design which by its rapid rotation cuts the grass to the desired height.

In accordance with this invention there is provided an edging and trimming attachment designated generally by the numeral 30 and which is detachably and adjustably mounted upon the support frame 12 of the lawn mower at the forward end thereof as shown in FIGURES 1–5, in a manner to be connected to and driven by the motor driven shaft 20 of the lawn mower.

Referring now especially to FIGURES 1, 2, 5 and 6 it will be observed that the attachment 30 consists of a plate-like base 32 which may conveniently be of a rectangular shape and which is removably clamped to the conventionally provided inclined portion 34 of the top and side wall 18 and 24 of the support frame of the lawn mower as by a transversely extending clamping bar 36 through the agency of fastening bolts 38 which may include wing nuts as shown. In this manner it will be evident that the support base 32 may be readily applied to or removed from the lawn mower by merely removing the two fastening bolts 38 and releasing the clamping bar 36.

Figure 5:
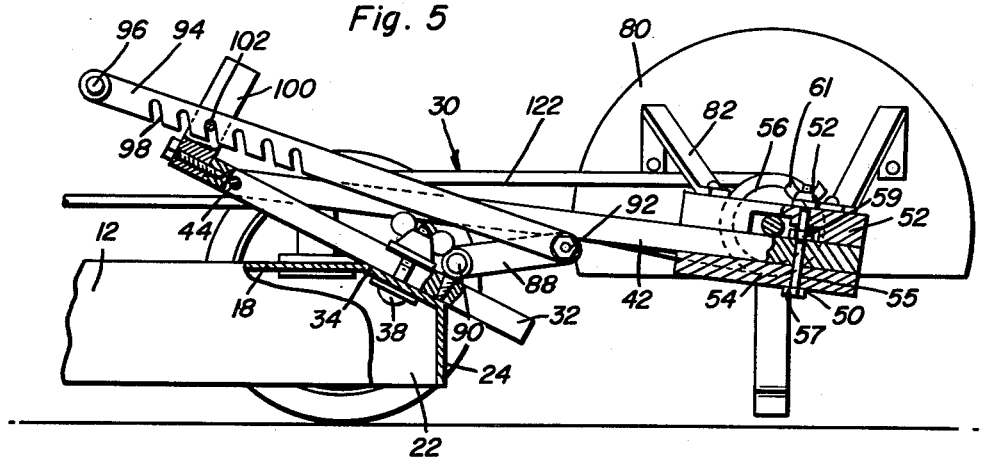
FIGURE 5 is a fragmentary enlarged detailed view in vertical longitudinal section of the front portion of the lawn mower support frame with the attachment mounted thereon.

From FIGURE 5 in particular it will be observed that the support base is mounted in a tilted position upon the lawn mower housing or support frame so that the forward end of the base projects forwardly of the lawn mower while the rear of the base is disposed above and overlies the front portion of the lawn mower frame. At its rear end, the support base is bifurcated, being provided with a slot 40 therein and the rearward end of a carriage 42 is pivoted in the rear end of this slot as by means of a transversely extending pivot pin 44 which may be provided with a cotter pin 46 to retain the latter in place. It will thus be apparent that the flat plate-like member comprising the carriage 42 extends from the rear end of the base 32 upwardly and forwardly therefrom with the forward ends of both the base and the carriage thus overlying and projecting forwardly of the front of the lawn mower itself.

Extending transversely across the forward end of the carriage 42 is a driven shaft 50 comprising the edger or trimmer shaft of the attachment. This shaft is supported in bearings or journal blocks 51 detachably secured as by fasteners 53 to a bearing plate 54 which extends transversely of and underlies the forward end of the carriage 42. A block 52 comprising a guard or shield overlies the shaft 50 and is removably secured to the carriage 42 in a manner to be now set forth. The braces 82 are suitably attached to the member 52.

Referring to FIGURE 5, it will be noted that a bolt or stud 55 extends through the members 52, 42 and 54, having a head or nut 57 at its lower end, a nut 59 intermediate its ends and a wing nut 61 at its upper end. In this manner the carriage 42 is detachably clamped to the bearing block 54 by the nuts 57 and 59 while the guard 52 is separately secured to the carriage 42 by the wing nut 61.

Referring now to FIGURES 1, 3, 4 and 7 in particular it will be seen that the edger or trimmer shaft 50 has secured thereto a pair of driven pulleys each indicated by the numeral 56. These pulleys are preferably disposed adjacent opposite ends of the shaft, which opposite ends are externally threaded as at 58 and have flanges 60 fixedly secured thereto as by welding or the like 62. Removably secured to either threaded end of the shaft 50 as by washers 64, 66 and a pair of locknuts 68 is the edger or trimmer blade 70. The latter, as shown best in FIGURE 4, has a pair of angulated outwardly projecting arms 72 extending from its hub portion, the ends of these arms having further angulated beveled cutting terminal blade portions 74. The arrangement is such that rotation of the blade arms by the axle or shaft 50, with the attachment being in its lowered position as set forth hereinafter, will cause the blade to bevel and trim the edge of the lawn thus providing a clear space between the lawn itself and the border to which the lawn extends.

It will be readily appreciated that the blade may be readily removed from one end of the shaft and mounted upon the other end when it is desired to effect the trimming operation at the opposite side of the lawn mower.

However, by virtue of the two pulleys 56 upon the shaft, the entire carriage 42 with the trimmer shaft mounted thereon may be removed from the base 32 by removing the pivot pin 44, may be turned over and replaced with the blade now disposed upon the other side of the carriage and with the other pulley 56 constituting the driving pulley of the shaft as set forth hereinafter.

In some instances, it may be desirable to employ a guard or shield to surround the edge and trimmer blade both to protect persons from injury by contact with the blade and also to protect the blade itself from damage by encountering foreign objects. For this purpose, a semi-circular hood or shield 80 is employed which is mounted as by brace members 82 to the block 52 and surrounds the upper portion and encloses the upper portion of the blade as will be apparent from a consideration of FIGURES 1–4. However, in some instances the shield or guard may be in itself dispensed with.

In accordance with this invention means are provided for vertically adjusting or tilting the position of the edger and trimmer blade between a fully raised inoperative position and a lowered operative position at different operating elevations whereby to obtain varying depths of cut by the edger blade. For this purpose there is provided an adjusting link 88 having thereon a fulcrum plate or blade 89 and whose lower end is pivoted as at 90 to any suitable portion of the base 32 and has its upper end pivoted as at 92 to an actuator bar 94. The upper horizontal edge of the plate 89 extends transversely of and slightly engages the underside of the hinged carriage 42. The actuator bar or rod 94 has a handle 96 thereon and is provided with a series of locking notches 98 by which the bar is adjustably secured to maintain the link 88 and its blade 89 in various positions of adjustment. To this end there is provided upon the base 32 a pair of upstanding anchor lugs 100 having a transversely extending anchor pin 102 therebetween. The arrangement is such that the actuator bar 94 may be received between these lugs with the notches 98 selectively engaged over the pin 102 to thus hold the locking bar in adjusted position and in turn maintain the carriage 42 in adjustably tilted position by means of the supporting and adjusting link 88.

Means are provided for readily driving the edger attachment from the power plant of the lawn mower. For this purpose, the motor or blade shaft 20 has a pulley 104 applied thereto above the internal combustion engine or power plant 16 and a belt 106 is entrained over this pulley and over a further pulley 108 carried by the upper end of a vertical stationary axle 110. The latter is mounted upon any suitable portion of the top wall 18 of the lawn mower frame and near its lower portion is provided with a second pulley 112 thereon to which is connected a driving belt 114. The latter in turn engages the lower pulley 116 of a stub axle 118 likewise fixedly mounted upon the forward portion of the lawn mower frame and which also carries an upper pulley 120. The latter has a belt 122 applied thereto and also engaged over the edger shaft driven pulley 56 as shown in FIGURE 1. Preferably 108 and 112 are double pulleys journaled on the axle 110 while 116 and 120 are likewise double pulleys journaled on the axle 118.

It will thus be apparent that there is provided a simple but effective means for transmitting power directly from the power plant of the lawn mower to the edger and trimmer attachment for operating the latter. It will be evident that by reversing one of the belts 106, 114 or 122, that the direction of rotation of the edger attachment may be also reversed as may be desired.

It should be noted that the junctions of the angulated portions 72 and 74 is by smooth curves rather than by sharp angles. Both edges of the blade 70 will be sharpened since the reversible rotation previously described will enable longer life of the blade between sharpenings thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A lawn edging and trimming attachment for power lawn mowers of the type having a support frame together with a rotatable grass mowing element mounted upon said frame and a source of power on said frame connected to said element, said attachment comprising a base, means mounting said base on said frame at one end thereof of the latter, a carriage tiltably mounted on and pivoted at its rear end to the rear end of said base and overlying said base, an edger shaft extending transversely of said frame, means journaling said shaft upon said carriage, an edger blade secured upon said shaft and disposed in laterally spaced relation to said frame, said carriage and said shaft extending forwardly beyond said frame, driving means connecting said shaft to said source of power, means for adjustably tilting said carriage about a horizontal axis for vertically adjusting said edger blade, said tilting means comprising a member extending transversely of said base and carriage and pivoted at its lower end to the forward portion of said base, said member having a supporting surface slidably engaging the underside of said carriage and an actuator pivoted to said member for effecting swinging of the latter for tilting of the carriage.

2. The combination of claim 1 wherein said carriage is reversibly mountable upon said base for reversely positioning said edger blade on either side of said frame.

3. The combination of claim 1 including a guard mounted upon and supported solely by said carriage and enclosing the upper portion of said edger blade.

4. The combination of claim 1 wherein said driving means comprises a belt and pulley system mounted upon the top of said support frame.

5. The combination of claim 1 including an anchor on said base for adjustably securing said actuating rod.

6. The combination of claim 1 wherein said base has its rear end overlying said frame and having a notch therein in said rear end, said carriage having its rear end pivotally mounted in the rear end of said notch, said tilting means comprising a plate extending transversely of said base and pivoted at its lower end to the forward portion of said base, said plate having a top edge slidably engaging the underside of said carriage across the width of the latter, said plate having an upwardly projecting portion at one side thereof, said actuator being pivoted to said upwardly projecting portion for effecting swinging of said plate and tilting of said carriage, anchor lugs fixedly mounted upon and rising from the rear end of said base, means detachably and adjustably securing said actuator to said anchor lugs and thereby retain said carriage in adjustably tilted position.

7. The combination of claim 6 including a mounting surface on the front end of said support frame which is inclined to both the vertical and horizontal planes, a clamping bar secured to said mounting surface and overlying said base plate for releasably but fixedly securing the latter to said support surface in tilted position.

8. The combination of claim 1 including a bearing block extending transversely of and secured to the underside of said carriage, said edger shaft being journaled on said bearing block and being disposed above said carriage, a cover block secured to the top of said carriage and overlying said edger shaft, a single fastener bolt extending through said cover block, carriage and bearing block, means securing said fastener bolt to said bearing block and carriage, a wing nut on said fastener bolt releasably securing said cover block to said fastener bolt.

9. The combination of claim 8 including a circular guard member surrounding the upper circumferential portion of said edger blade, brace means connected to said guard member and to said cover block for simultaneous removal of said guard member with said cover block.

10. The combination of claim 9 wherein said cover block and guard are removably mounted for positioning said carriage and trimmer blade selectively in various positions.

References Cited by the Examiner
UNITED STATES PATENTS

| | | | |
|---|---|---|---|
| 2,478,587 | 8/49 | Bonte | 56—256 |
| 2,618,919 | 11/52 | Hutchens | 56—25.4 |
| 2,707,361 | 5/55 | Thomas | 56—25.4 |
| 2,771,730 | 11/56 | True | 56—25.4 |
| 2,791,077 | 3/57 | Lyle | 56—256 X |
| 2,877,619 | 3/59 | Benson et al. | 56—295 |

T. GRAHAM CRAVER, *Primary Examiner.*

ANTONIO F. GUIDA, *Examiner.*